(12) United States Patent
Uemura et al.

(10) Patent No.: US 7,814,739 B2
(45) Date of Patent: Oct. 19, 2010

(54) RIDING TYPE MOWER

(75) Inventors: Katsuhiko Uemura, Sakai (JP); Hiroki Nagai, Sakai (JP); Tomoyuki Morikawa, Takatsuki (JP); Ryouzou Imanishi, Kishiwada (JP); Hiroaki Kitaguchi, Takaishi (JP); Takashi Fujii, Sakai (JP); Nobuyuki Yamashita, Izumi (JP); Toshiki Kanai, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/372,983

(22) Filed: Feb. 18, 2009

(65) Prior Publication Data
US 2010/0031620 A1 Feb. 11, 2010

(30) Foreign Application Priority Data

Aug. 5, 2008 (JP) ............................. 2008-202304
Aug. 5, 2008 (JP) ............................. 2008-202305

(51) Int. Cl.
*A01D 67/00* (2006.01)
(52) U.S. Cl. ................................... 56/320.2
(58) Field of Classification Search ................. 56/320.1, 56/320.2
See application file for complete search history.

(56) References Cited

U.S. PATENT DOCUMENTS

| 6,609,358 | B1 * | 8/2003 | Schmidt et al. ............ 56/320.2 |
| 7,174,700 | B2 * | 2/2007 | Chenevert et al. ................ 56/2 |
| 2008/0092509 | A1 | 4/2008 | Imanishi et al. |

FOREIGN PATENT DOCUMENTS

| JP | 62167521 | 10/1987 |
| JP | 2008099610 | 1/2008 |

\* cited by examiner

*Primary Examiner*—Alicia M Torres
(74) *Attorney, Agent, or Firm*—The Webb Law Firm

(57) ABSTRACT

A riding type mower includes: a vehicle body, a driver's seat mounted on the vehicle body; an operation part arranged around the driver's seat; a mower unit provided on the vehicle body; a shutter for closing a discharge port; a shutter moving mechanism for moving the shutter between a close position closing the discharge port and an open position opening the discharge port; and a lock mechanism for locking the shutter at the close position. The mower unit includes: a mower deck; a cutting blade installed inside the mower deck; the discharge port formed in the mower deck, through which mown grass cut by the blade is discharge from the mower unit to outside. A shutter operating tool for remotely operating the shutter moving mechanism to open and close the shutter is provided in the operation part. The lock mechanism is remotely operable from the operation part.

5 Claims, 12 Drawing Sheets

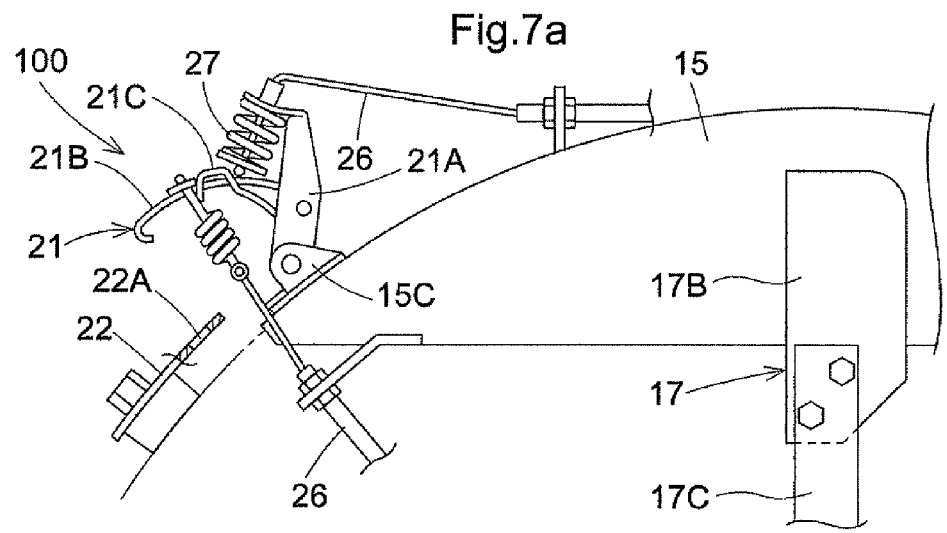
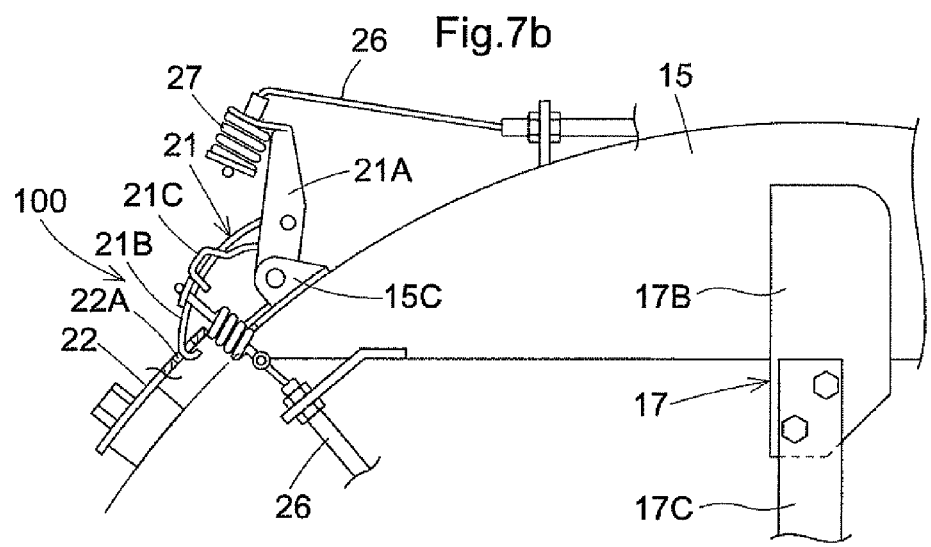
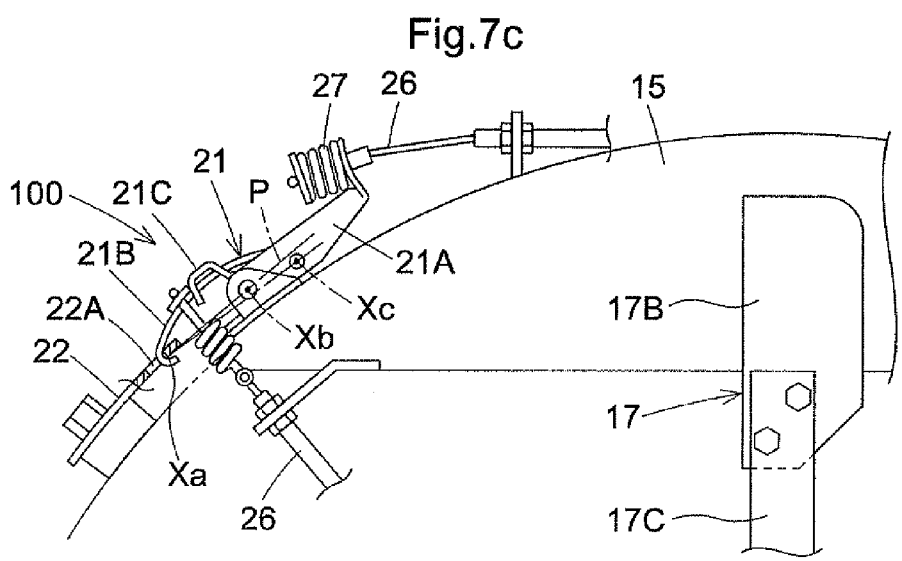

RIDING TYPE MOWER

BACKGROUND OF THE INVENTION

1. Field of the Invention

The present invention relates to a riding type mower including: a vehicle body; a driver's seat mounted on the vehicle body; an operation part arranged around the driver's seat; a mower unit provided on the vehicle body which has a mower deck, a cutting blade installed inside the mower deck, and a discharge port formed in the mower deck, through which mown grass cut by the cutting blade is discharged from an interior space of the mower unit to outside; and a shutter configured to close the discharge port.

2. Description of the Related Art

For the riding type mower of the prior art as described above, there can be mentioned one disclosed in Japanese patent application JP2008-99610A (paragraphs 0051-0052 and FIGS. 4, 5, 8 and 9), in which a latch as lock fitting is provided in a rear end portion of the slide cover as a shutter for opening and closing the discharge port, and a hook as lock receiver is provided in a portion of the mower unit in the vicinity of the discharge port, with the latch and the hook serving as a lock mechanism.

In this lock mechanism, the closure is performed by manually moving the slide cover to close the discharge port, and then by manually engaging and the latch with the hook to lock the slide cover.

In addition, Japanese utility model application JP62-167521U discloses a technique for operating a slide cover from an operation part region.

In the above-mentioned prior art techniques, every time the slide cover is to be operated, the driver should leave the driver's seat to access the slide cover on the mower deck, which necessitates a considerable work load on the driver.

SUMMARY OF THE INVENTION

Therefore, it would be desirable to provide a riding type mower in which the shutter is operable from the operation part, without the driver accessing the mower deck.

Therefore, a riding type mower according to the present invention includes: a vehicle body; a driver's seat mounted on the vehicle body; an operation part arranged around the driver's seat; a mower unit provided on the vehicle body, including a mower deck, a cutting blade installed inside the mower deck, and a discharge port formed in the mower deck, through which mown grass cut by the cutting blade is discharged from an interior space of the mower unit to outside; a shutter configured to close the discharge port; a shutter moving mechanism configured to move the shutter between a close position at which the discharge port is closed and an open position at which the discharge port is opened; a shutter operating tool which is provided in the operation part and is configured to remotely operate the shutter moving mechanism to open and close the shutter; and a lock mechanism which is configured to lock the shutter at the close position and is remotely operable from the operation part.

With this configuration, a driver seated in the driver's seat can operate the movement of the shutter relative to the discharge port, through the shutter moving mechanism remotely operable by the shutter operating tool provided in the operation part. In addition, since the lock mechanism for locking the shutter at the close position is provided, an unwilling movement of the shutter is prevented, which may otherwise be caused by vibration of the mower deck. This lock mechanism can be operated from the operation part.

In a preferred embodiment of the present invention, the shutter operating tool and the shutter moving mechanism are linked through a mechanical displacement transmitting mechanism configured to mechanically transmit an operational displacement of the shutter operating tool to the shutter moving mechanism. With this configuration, the shutter operating tool and the shutter moving mechanism (eventually the shutter) are linked mechanically. Accordingly, stability regardless of the environment, as well as a natural maneuvering feeling, can be attained.

In other preferred embodiment of the present invention, the shutter operating tool and the shutter moving mechanism are linked through an electronic control system configured to receive an operational displacement of the shutter operating tool as an operation signal and to output a control signal for controlling the shutter moving mechanism based on the operation signal. With this configuration, the shutter operating tool and the shutter moving mechanism (eventually the shutter) are linked electrically. Accordingly, the control signal is transmitted to the shutter moving mechanism with or without wires. Even in the case where the transmission is through wires, a thin flexible cable is applicable, and thus an arrangement thereof can be freely designed.

Specifically, the electronic control system may include: an operation position detecting sensor configured to detect a position of a switching operation of the shutter operating tool; a shutter opening/closing determining section configured to determine whether the shutter is opened or closed based on a detection signal from the operation position detecting sensor; and a shutter driving section configured to output a control signal for controlling the shutter moving mechanism based on a determination result of the shutter opening/closing determining section.

In still another preferable embodiment of the present invention, a setting of a locking state or a lock release state of the lock mechanism is performed by operating the shutter operating tool. With this configuration, the lock mechanism can also be conveniently operated from the operation part. Of course, if necessary, other configurations can be adopted in which a setting of a locking state or a lock release state of the lock mechanism is performed by operating a lock switch operating tool other than the shutter operating tool.

With the above-described configurations, the shutter operating tool can be operated from the operation part. However, if the shutter operating tool is allowed to be operated during the mowing work by the mower unit, a discharge work state or mulching work state, with the shutter opened or closed, is switchable despite the operator's intention. Accordingly, in a preferred embodiment of the present invention, the riding type mower further includes: a PTO clutch configured to be switched between an on state in which a power is transmitted to the mover unit and an off state in which the power transmission is cut off; and a restraining device. The restraining device is configured to allow a switching of the shutter based on an operation of the shutter operating tool when the PTO clutch is in the off state, and to restrain the switching of the shutter based on the operation of the shutter operating tool, when the PTO clutch is in the on state.

With this configuration, the riding type mower can be provided in which a switching between a discharge work state and a mulching work state during a mowing work can be prevented, while alleviating a working load of switching between these work states.

When the PTO clutch is switched to the off state, an opening/closing operation of the shutter becomes operable. However, immediately after the operation of the PTO clutch to the off state, the action of the mower unit may not be completely stopped. Therefore, in a preferable embodiment the restraining device blocks the switching of the shutter until a predetermined period of time elapses since the PTO clutch is switched to the off state. With this configuration, an opening or closing operation of the shutter during the mower unit movement can be prevented.

Other features and advantages of the present invention will become apparent from the descriptions of embodiments below, with reference to the attached drawings.

BRIEF DESCRIPTION OF THE DRAWINGS

FIG. 7a is a plan view of the lock mechanism showing a state in which the shutter is moving to a close position.

FIG. 7b is a plan view showing a state in which the shutter is closed and a lock engaging piece of the lock mechanism is engaged with a locking hole.

FIG. 7c is a plan view showing a state in which the shutter is closed and a locking state is completed with a locking lever of the lock mechanism.

DETAILED DESCRIPTION OF THE PREFERRED EMBODIMENTS

First Embodiment

Figure 1:
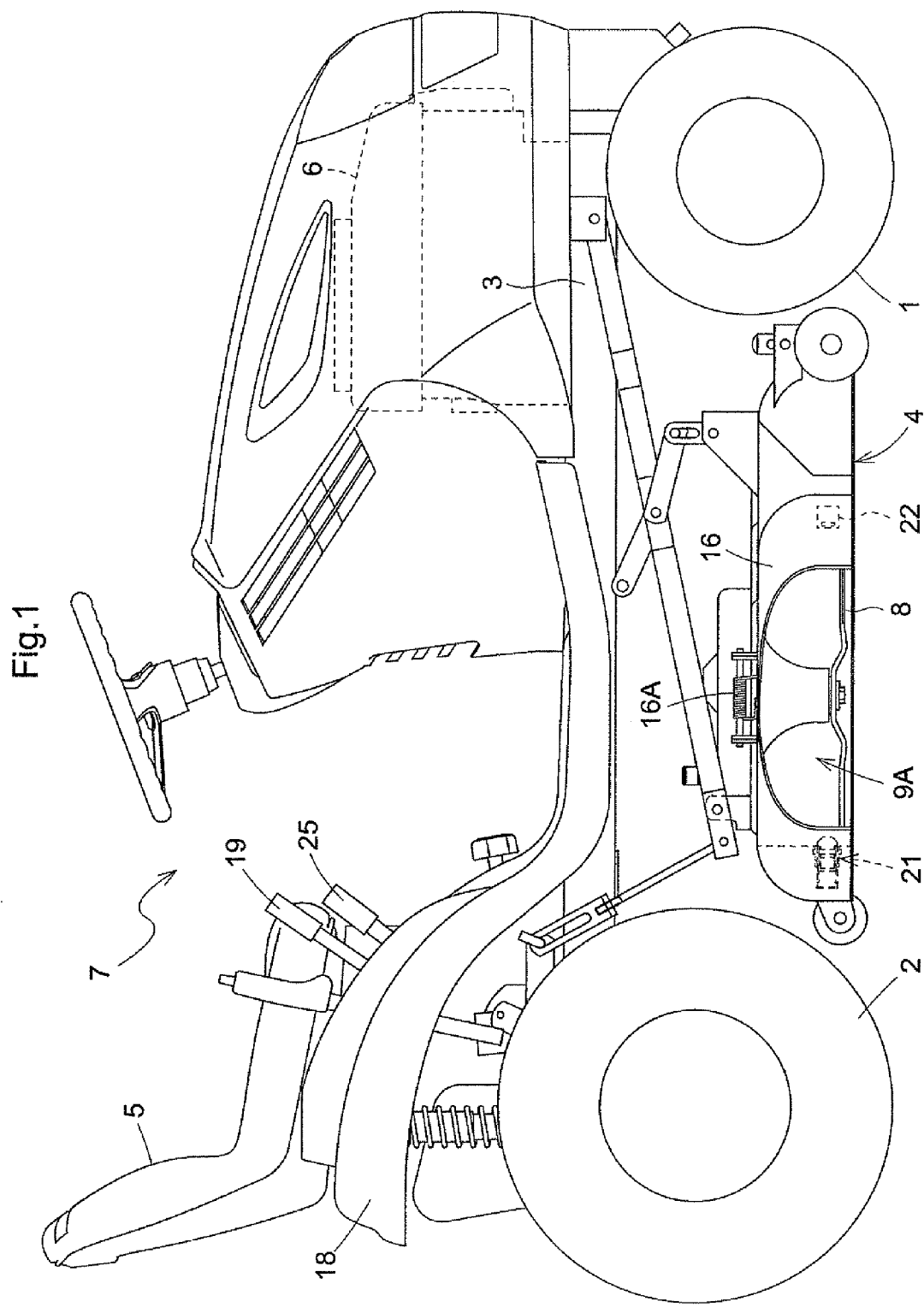
FIG. 1 is an overall side view showing a riding type mower.

As shown in FIG. 1, one example of a riding type mower includes: a vehicle body 3 as a frame body supported by right and left front wheels 1 and right and left rear wheels 2; a mower unit 4 supported downward by a middle portion of the vehicle body 3; a driver's seat 5 mounted on a rear portion of the vehicle body 3; an operation part 7 arranged around the driver's seat 5; and an engine 6 supported by a front portion of the vehicle body 3.

Figure 2:
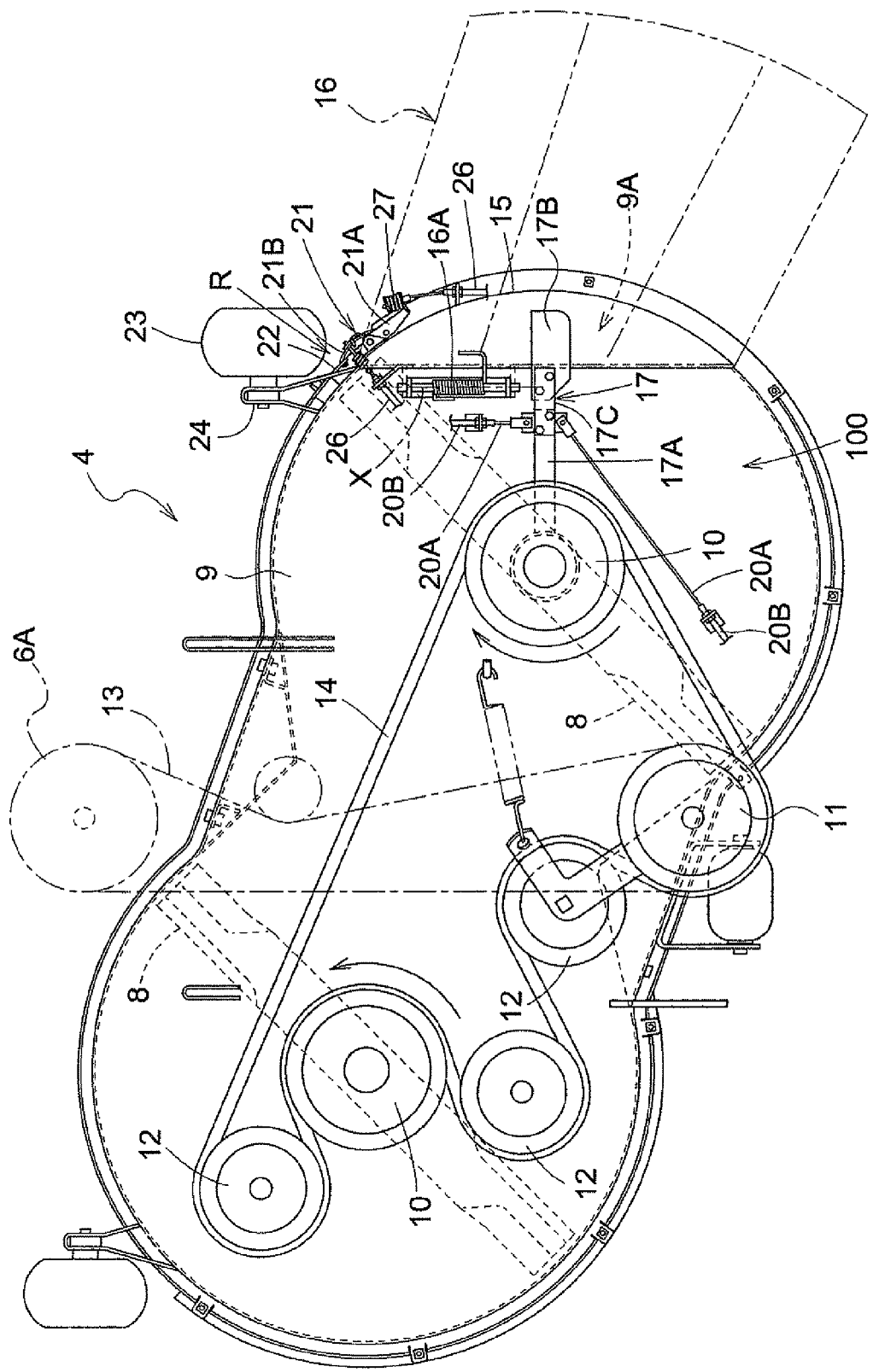
FIG. 2 is a plan view of a mower unit.

A structure of the mower unit 4 will be described below. As shown in FIG. 2, the mower unit 4 includes right and left cutting blades 8, and a mower deck 9 configured to encase and support the cutting blades 8. On an upper face of the mower deck 9, there are arranged driving pulleys 10 configured to drive the cutting blades 8, an input pulley 11 configured to receive a power transmitted from the engine 6, and other tension pulleys 12.

A transmission belt 13 is wrapped around the input pulley 11 and an output pulley 6A of the engine 6, so as to transmit a power from the engine 6 to the mower unit 4. An endless belt 14 is wrapped around the input pulley 11, the driving pulleys 10, and the tension pulleys 12 on the upper face the mower deck 9, so as to rotatably drive the right and left cutting blades 8.

Figure 3:
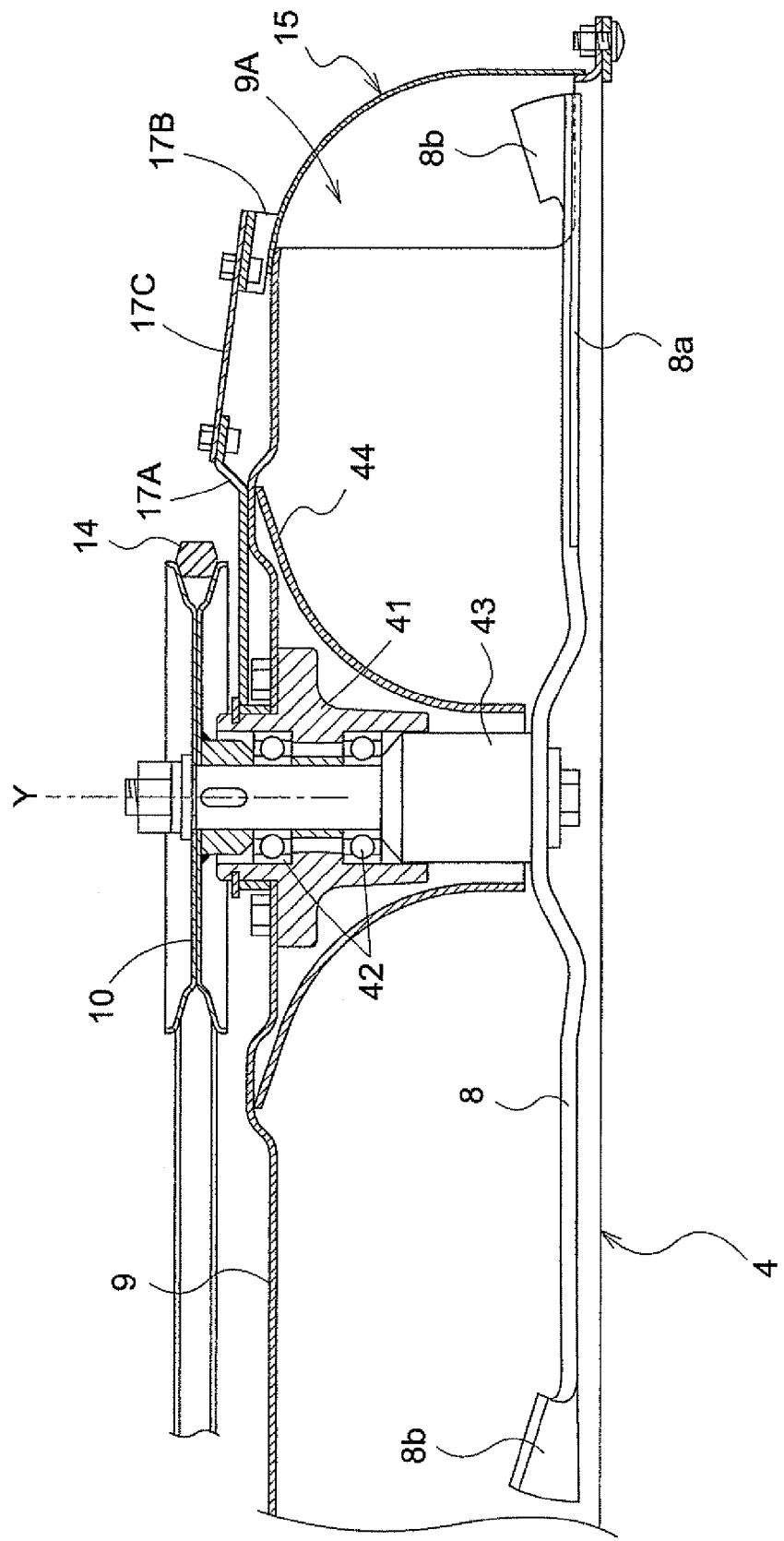
FIG. 3 is a longitudinal sectional rear view of the mower unit.

A driving structure of the cutting blade 8 will be described. As shown in FIG. 3, a rotational boss part 41 is secured to the mower deck 9 under the driving pulley 10, and a drive shaft 43 is rotatably supported in the rotational boss part 41 through a bearing 42. Around the rotational boss part 41, a guide 44 configured to guide shredded mown grass is provided. To an upward protruding end of the drive shaft 43 above the rotational boss part 41 is attached the driving pulley 10, while to a downward protruding end below the guide 44 is attached the cutting blade 8. The cutting blade 8 has cutting edges 8a formed in front ends in a rotational direction, and wind-creating pieces 8b formed in longitudinal ends.

Figure 4:
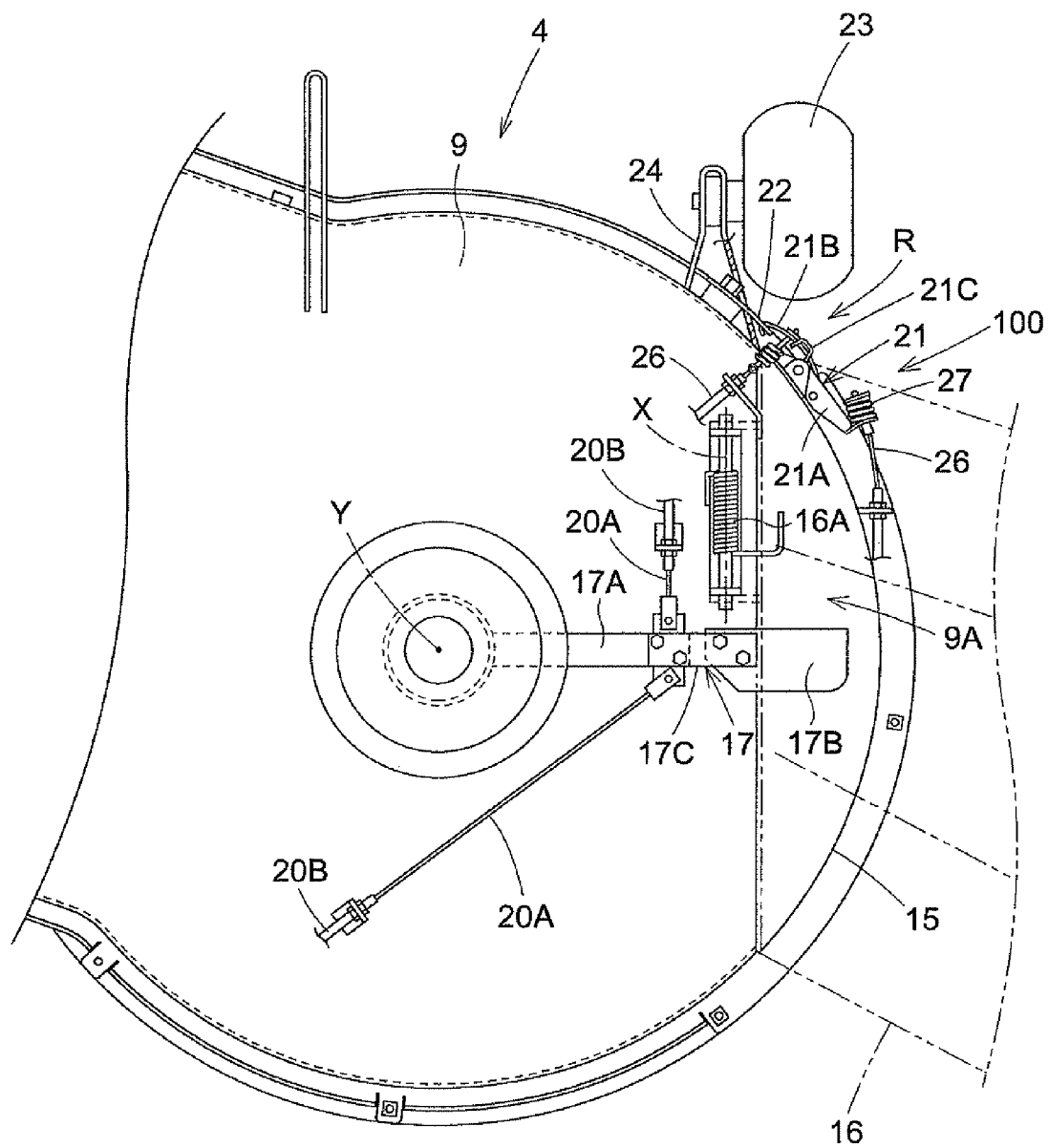
FIG. 4 is a plan view showing a wire linkage between a shutter and a shutter operating lever, and a wire linkage between a lock mechanism and a lock switch operating lever.

As shown in FIGS. 2 to 4, on a right end of the mower deck 9, a discharge port 9A is formed, through which mown grass is to be discharged from the mower deck 9. A shutter 15 is provided on the discharge port 9A, which is switchable between a side discharge work state in which the discharge port 9A is opened for discharging mown grass, and a mulching work state in which the discharge port 9A is closed for shredding mown grass.

Upward of the discharge port 9A, a discharge guide 16 is attached swingably in a vertical direction about a horizontal shaft core X and biased downward by a torsion spring 16A, and thus switchable between a retraction position at which the discharge guide 16 stands above the mower deck 9 and a working position at which the discharge guide 16 extends outward from a right side of the mower deck 9.

Next, a structure for switching the discharge port 9A of the shutter 15 between an opened state and a closed state will be described. As shown in FIG. 3, the shutter 15 is composed of an arc portion along a side face of the mower deck 9 and a roof portion upward of the arc portion, which are integrally formed as a dome-like shape.

As shown in FIGS. 1 to 6, between the shutter 15 and a rotating shaft core Y of the right cutting blade 8, a drive mechanism 17 is disposed. The drive mechanism 17 is composed of: a drive arm 17A configured to fit freely and rotatably onto the rotational boss part 41 supporting the cutting blade 8; a bracket 17B fixed to the roof portion of the shutter 15; and a plate spring 17C connecting the drive arm 17A to the bracket 17B. By rotatably driving the drive arm 17A about the rotating shaft core Y, the shutter 15 is switched between an opened state and a closed state. The plate spring 17C absorbs swing or vibration of the shutter 15 which may be caused during a movement of the shutter 15, to thereby facilitate a smooth movement of the shutter 15.

Figure 5:
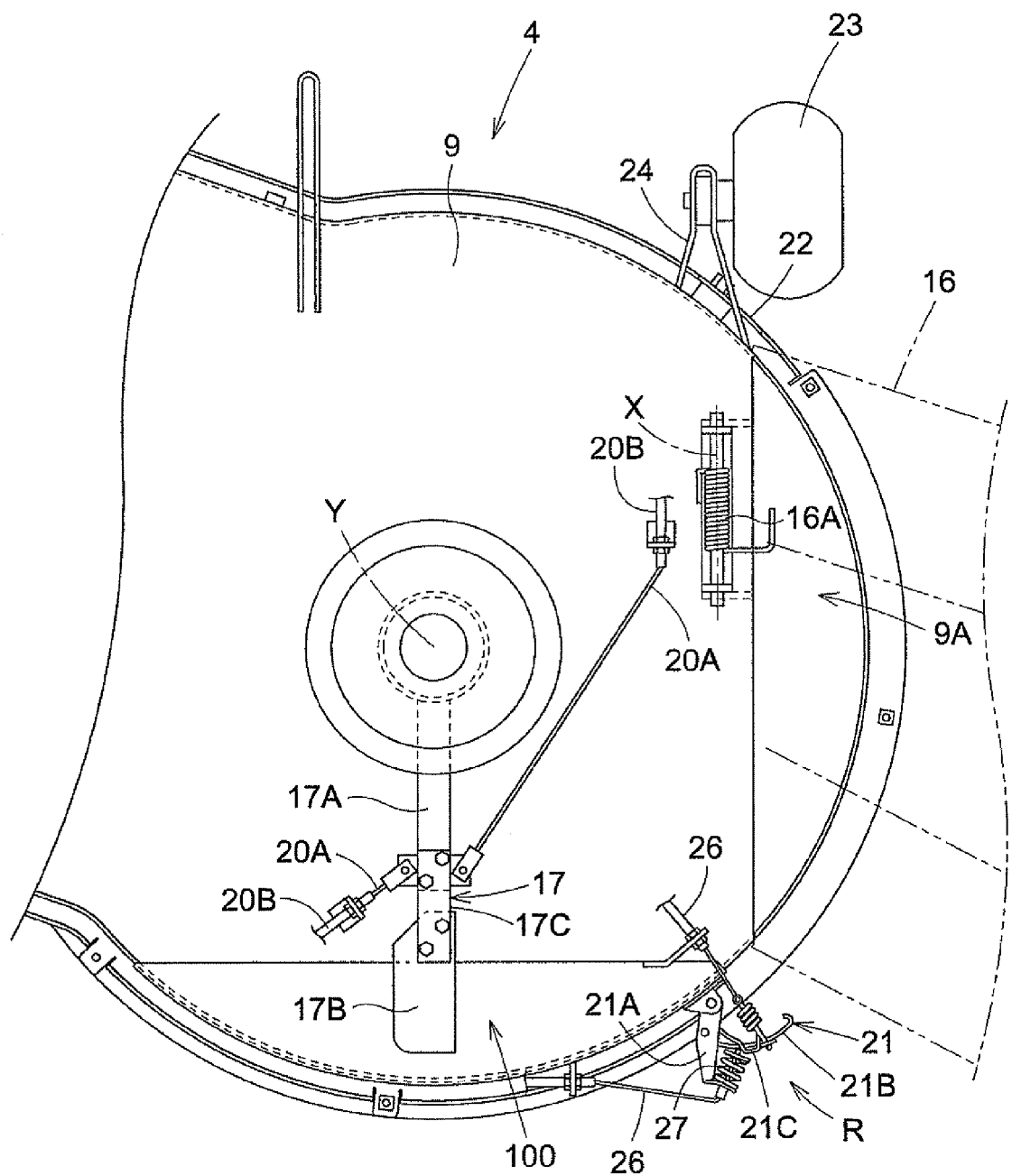
FIG. 5 is a plan view showing a state in which the shutter is in an open position.

With the drive arm 17A, the shutter 15 is switchable between a closed state in which the discharge port 9A is covered as shown in FIGS. 2 and 4, and an opened state in which the shutter 15 is away from the discharge port 9A and moves to a rear side of the mower deck 9 to open the discharge port 9A as shown in FIG. 5.

Figure 6:
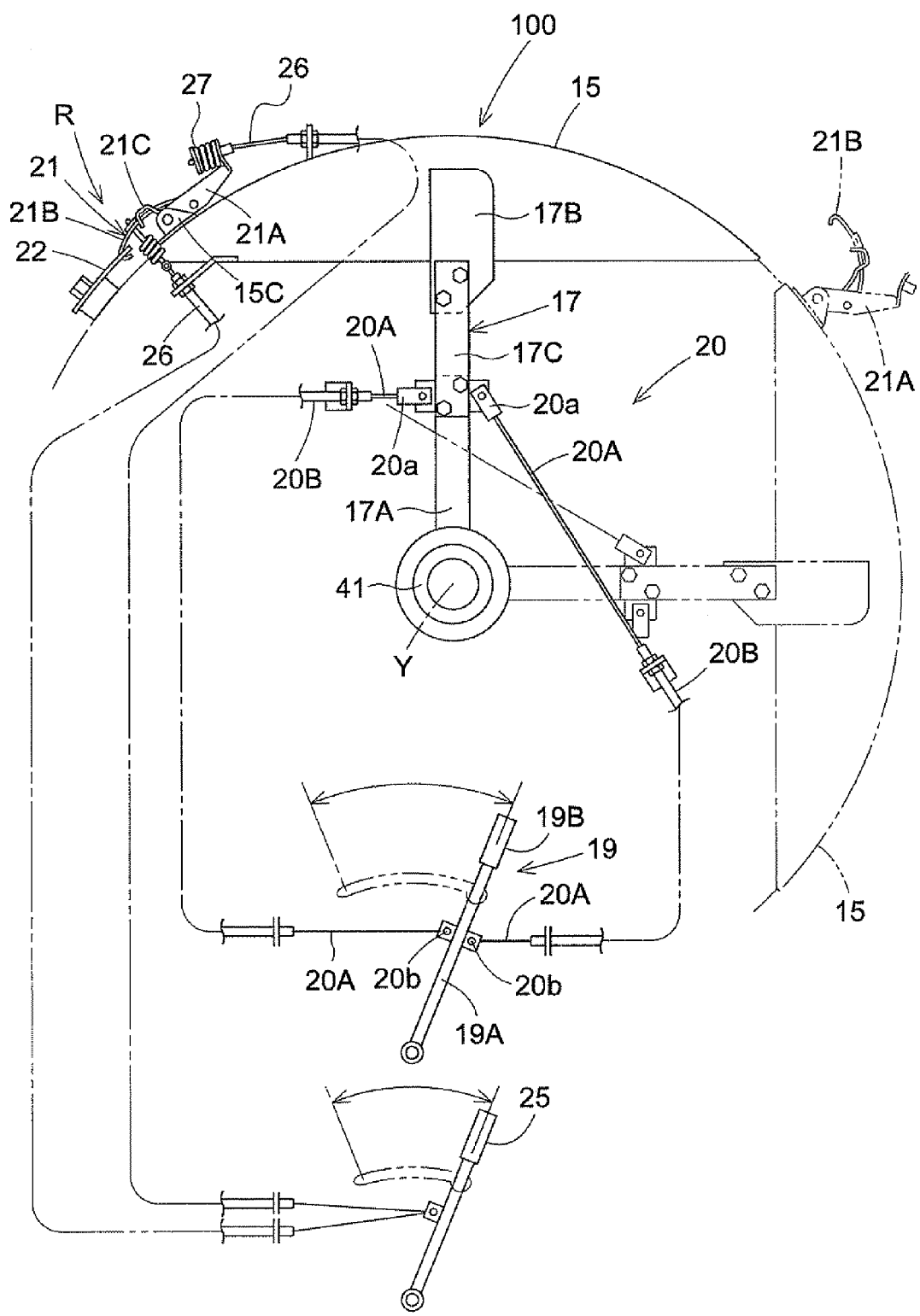
FIG. 6 is a plan view showing a linkage between the shutter and the shutter operating lever, and a linkage between the lock mechanism and the lock switch operating lever.

A structure for driving the opening/closing of the shutter 15 will be described. As shown in FIGS. 1 and 6, a shutter operating lever 19 as a shutter operating tool is provided on a rear wheel fender 18 on a lateral side of the driver's seat 5. The shutter operating lever 19 includes a frame part 19A and a grip part 19B formed thereon, and is swingable in a vertical direction about a horizontal shaft core.

In a shutter moving mechanism 100 for operating the shutter 15 on the basis of an operational displacement of the shutter operating tool 19, at a position where the drive arm 17A is joined to the plate spring 17C, ends 20a of inner wires 20A of release wires 20 are also joined, while the other ends 20b of the inner wires 20A are connected to the shutter operating lever 19. The release wire 20 is composed of: the inner wire 20A connecting the drive arm 17A to the shutter operating lever 19; and an outer wire 20B for holding the inner wire 20A therein.

A locking structure for the shutter 15 will be described. As shown in FIGS. 2 and 4 to 6, a lock fitting 21 is provided on a front end portion of the shutter 15 (in a closed state) with the proviso that the direction corresponds to the direction of the mower deck 9.

Figure 8A:
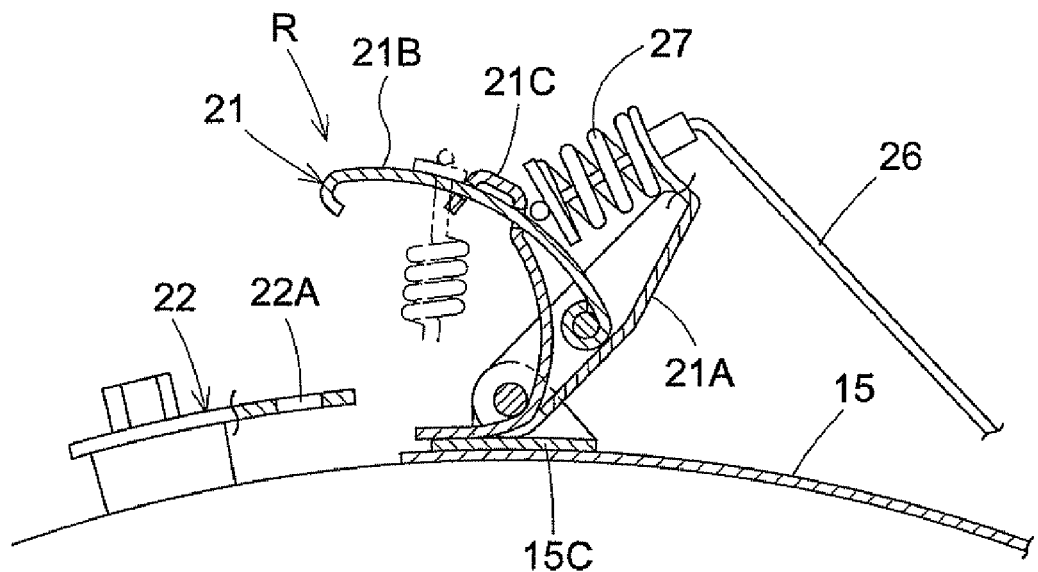
FIG. 8a is a plan view of a lock mechanism showing a state in which the shutter is moving to a close position.
Figure 8B:
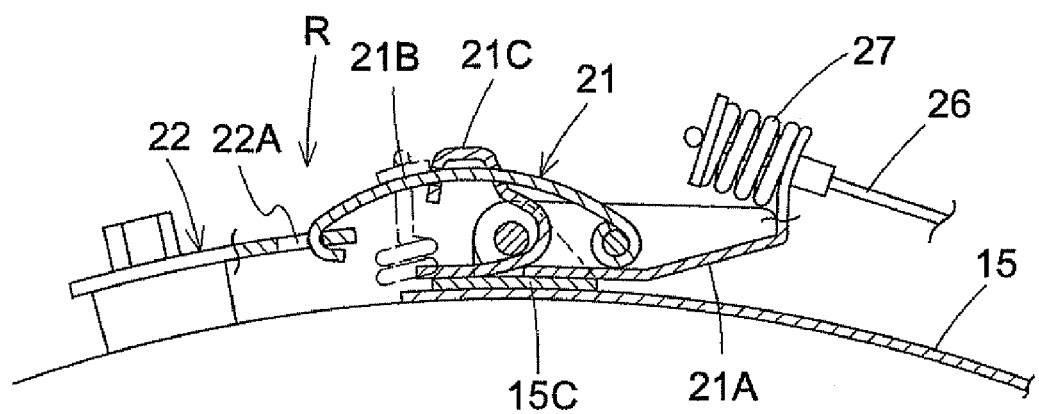
FIG. 8b is a plan view showing a state in which the shutter is closed and a locking state is completed with the locking lever of the lock mechanism.
Figure 9:
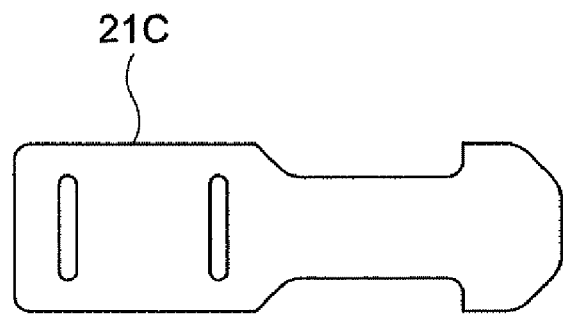
FIG. 9 is a plan view showing a biasing rubber.
Figure 10:
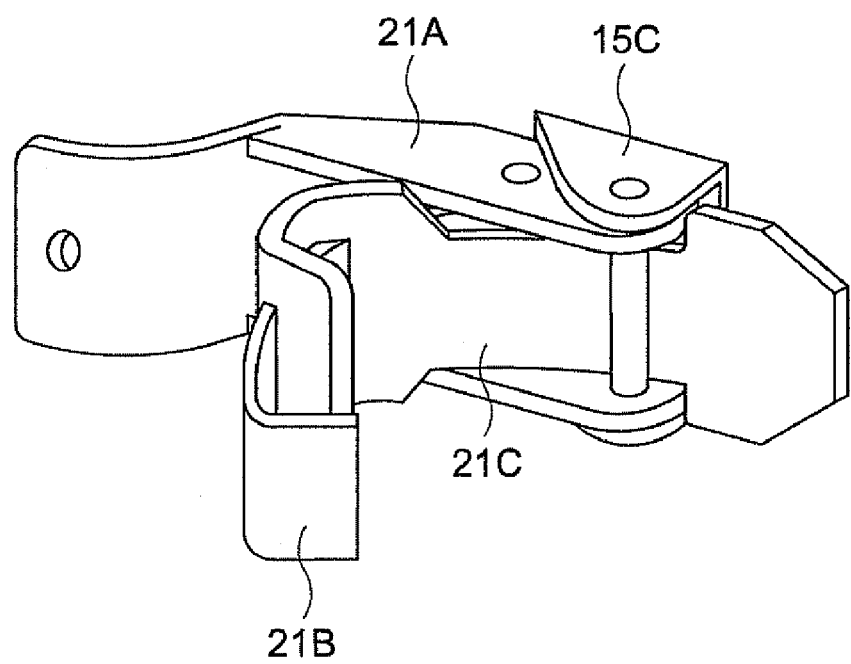
FIG. 10 is a perspective view showing the lock mechanism.

As shown in FIGS. 8a, 8b and 10, the lock fitting 21 is composed of: a locking lever 21A cantilevered and supported swingably in a horizontal direction by upper and lower arms of a bracket 15C provided on the shutter 15; a lock engaging piece 21B supported swingably in a horizontal direction about a vertical shaft core at a middle portion of the locking lever 21A; and a biasing rubber plate 21C configured to bias the lock engaging piece 21B in a direction that releases the locking.

On the other hand, a lock receiver 22 is provided on the mower deck 9 in the vicinity of a front end of the discharge port 9A, as shown in FIGS. 5, 7a to 7c, 8a and 8b. The lock receiver 22 extends from a side of a support bracket 24 of a front gauge wheel 23 supporting the mower deck 9, and has a locking hole 22A formed therein for engaging with a terminal locking portion of the lock engaging piece 21B.

With the configuration described above, by moving the shutter 15 to a closed state and engaging the lock engaging piece 21B with the locking hole 22A, the movement of the shutter 15 is regulated so that the shutter 15 is kept in the closed state.

Herein, the lock fitting 21 and the lock receiver 22 form a lock mechanism R for locking the shutter 15.

An operating structure for the lock mechanism R will be described. As shown in FIGS. 1 and 6, a lock switch operating lever 25 as a lock switch operating tool for switching the lock mechanism R is provided in the vicinity of the shutter operating lever 19. The lock switch operating lever 25 is linked to the locking lever 21A and also to the lock engaging piece 21B, through respective release wires 26.

A detailed operation of the lock fitting 21 is as follows. As shown in FIGS. 7a and 8a, when the shutter 15 is moving to a close position, the lock engaging piece 21B is in an opened state due to a presence of the biasing rubber plate 21C. In other words, to an inner side face of the lock engaging piece 21B is attached the biasing rubber plate 21C which biases the lock engaging piece 21B in a direction away from the shutter 15. With this configuration, when the shutter 15 is moving to the close position, the lock engaging piece 21B is prevented from being unwillingly stuck at a rim portion the discharge port 9A, and thus locking operation is prevented from being hindered.

When the shutter 15 reached the close position, the lock operating lever 25 is operated so that the lock engaging piece 21B swings to a lock receiver 22 side, and as shown in FIG. 7b, the lock engaging piece 21B is locked in the locking hole 22A of the lock receiver 22. Although the locking lever 21A is also pulled by the release wire 26 linked to the lock engaging piece 21B, the locking lever 21A slightly swings together with the lock engaging piece 21B, since the locking lever 21A has a stroke absorption spring 27 provided between the release wire 26 and a receiving piece of the locking lever 21A.

When the lock operating lever 25 is further operated from a state shown in FIG. 7b, an absorption stroke by the stroke absorption spring 27 reaches a limit, and by a little horizontal swing of the locking lever 21A towards the shutter 15 (away from the lock engaging piece 21B) as shown in FIG. 7c, the locking is achieved. In other words, by pulling the locking lever 21A towards the shutter 15, a swing pivot Xc of the lock engaging piece 21B relative to the locking lever 21A shifts closer to the shutter 15, over an extended line from a straight line P connecting an engaging portion Xa of the lock engaging piece 21B with the locking hole 22A to a swing pivot Xb of the locking lever 21A.

With this configuration, the swing pivot Xc of the lock engaging piece 21B relative to the locking lever 21A crossed the dead point, and a locking state is maintained.

Second Embodiment

In the first embodiment, descriptions are made with respect to a configuration in which the shutter 15 and the lock mechanism R are linked through the mechanical linkage mechanism and are operated by the shutter operating lever 19 and the lock switch operating lever 25, respectively.

Herein, an electronic control system will be described, through which the shutter 15 and the shutter operating lever 19 are linked electrically.

Figure 11:
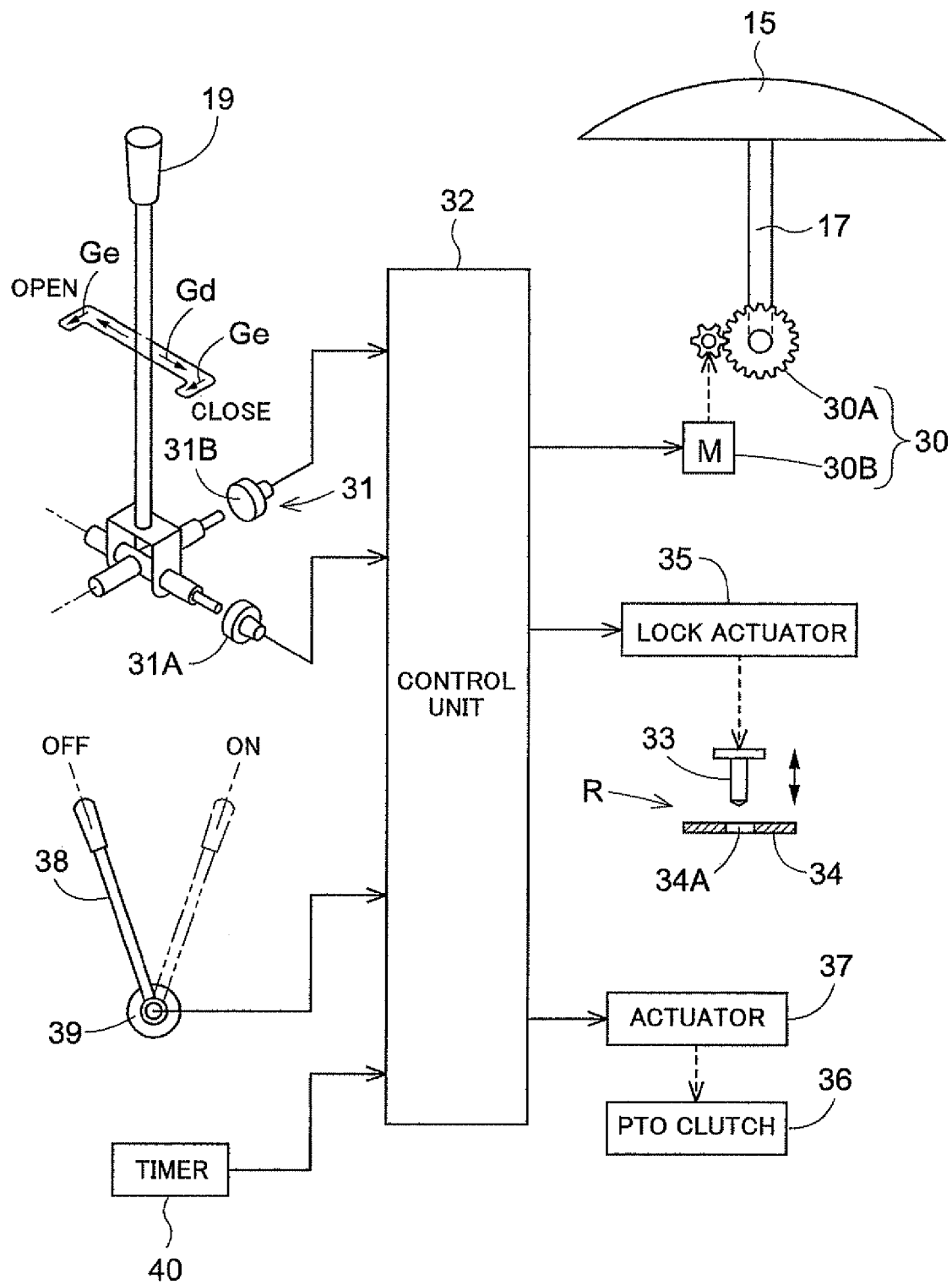
FIG. 11 is a diagram showing a second embodiment in which a shutter and a lock mechanism are operated through an electronic control system.
Figure 12:
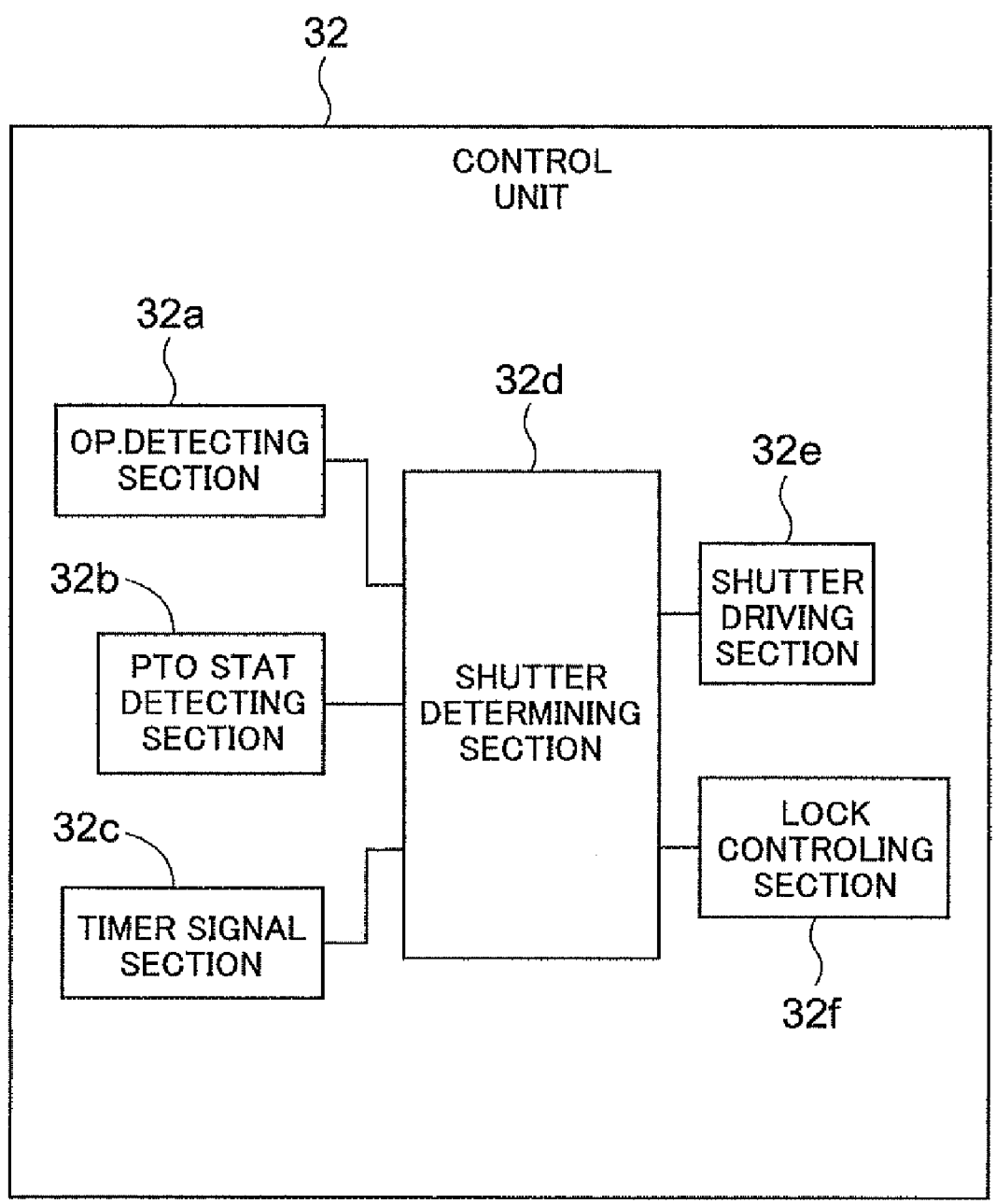
FIG. 12 is a functional block diagram of a control unit.

As shown in FIGS. 11 and 12, the electronic control system includes: an opening/closing actuator 30 configured to drive the shutter 15; an operation position detecting sensor 31 configured to detect a position of a switching operation of the shutter operating lever 19; and a control unit 32 configured to drive and control the opening/closing actuator 30 based on a detection signal from the operation position detecting sensor 31.

The opening/closing actuator 30 includes: a drive gear mechanism 30A provided at a rocking shaft core position of the drive arm 17A; and a drive motor 30B configured to drive the drive gear mechanism 30A.

As shown in FIG. 12, the control unit 32 includes: an operation detecting section 32a; a PTO state detecting section 32b; a timer signal acquiring section 32c; a shutter opening/closing determining section 32d; a shutter driving section 32e; and a lock controlling section 32f. The operation detecting section 32a is configured to calculate an operation position of the shutter operating lever 19, based on a detection signal from the operation position detecting sensor 31. The PTO state detecting section 32b is configured to calculate an operation position of a clutch operating lever 38, based on a detection signal from a clutch operation position detecting sensor 39. The timer signal acquiring section 32c is configured to acquire a signal from a timer 40. The timer 40 may be included in the control unit 32. The shutter opening/closing determining section 32d is configured to determine whether the shutter 15 is to be opened or closed, based on information from the operation detecting section 32a, and optionally information from the PTO state detecting section 32b and/or the timer signal acquiring section 32c. The shutter driving section 32e is configured to output a control signal for controlling the motor 30B, which is a part of an actuator in the shutter moving mechanism 100, based on the determination result. The lock controlling section 32f is configured to output a control signal for controlling a lock actuator 35, based on the determination result of the shutter opening/closing determining section 32d.

Herein, though only schematically shown in the drawings, a structure for locking the shutter 15 in a closed state is composed of an engaging lock pin 33 and an engaging hole 34A for engaging with the engaging lock pin 33. Though not shown, the engaging lock pin 33 is slidably provided in the vicinity of the rim portion of the discharge port 9A, and a bracket 34 having the engaging hole 34A formed therein is attached to the shutter 15.

The engaging lock pin 33 is slidably driven by the lock actuator 35 which is driven and controlled through the control unit 32.

As shown in FIG. 11, the shutter operating lever 19 is configured to be operable along a shutter opening/closing switching guide Gd extending in a vehicle body front-rear direction, and lock mechanism switching guides Ge extending in an orthogonal direction to the opening/closing switching guide Gd, located at both ends of the opening/closing switching guide Gd.

The operation position detecting sensor 31 configured to detect a position of a switching operation of the shutter operating lever 19 is composed of: a shutter detection sensor 31A configured to detect a position along the shutter opening/closing switching guide Gd which corresponds to a position of the shutter 15; and a lock detection sensor 31B configured to detect a position along the lock mechanism switching guide Ge.

With the configuration described above, when the shutter operating lever 19 is shifted along the shutter opening/closing switching guide Gd, the position thereof is detected by the shutter detection sensor 31A, and a detection result is transmitted to the drive motor 30B through the control unit 32, to thereby drive the opening/closing of the shutter 15. Likewise, when the shutter operating lever 19 is shifted along the lock mechanism switching guide Ge, the position thereof is detected by the lock detection sensor 31B, to thereby operate the lock mechanism R.

With this configuration, a driver can perform switching operations of the shutter 15 and the lock mechanism R, in the operation part 7.

An operation system of a PTO clutch 36 will be described below. As shown in FIG. 11, on/off (engaged/disengaged) states of the PTO clutch 36 is configured to be driven by an actuator 37, and the clutch operating lever 38 configured to operate the on/off states of the PTO clutch 36 is provided.

At a base end portion of the clutch operating lever 38, the clutch operation position detecting sensor 39 is provided which detects whether the clutch operating lever 38 is in an clutch-in position or a clutch-cut position.

The control unit 32 is configured to drive and control the actuator 37 based on the detection result of the clutch operation position detecting sensor 39, to thereby switch the PTO clutch 36 between an on state (in which a power is transmitted) and an off state (in which the power transmission is cut off).

When the clutch operation position detecting sensor 39 detects an on state of the PTO clutch 36, the action of the opening/closing actuator 30 is regulated. Specifically, when the PTO clutch 36 is in an on state and the cutting blade 8 of the mower unit 4 is working, an operation of the shutter 15 for opening or closing the discharge port 9A of the mower deck 9 is restrained by the function of the shutter opening/closing determining section 32d of the control unit 32.

Further, the electronic control system includes the timer 40, and is configured to allow the operation of the shutter 15 only when a predetermined period of time has elapsed after the timer 40 is activated, which activation is made when the PTO clutch 36 is shifted to an off state and the clutch operation position detecting sensor 39 detects that shifting. In general, when the PTO clutch 36 is shifted to the off state, the cutting blade 8 requires a time lag in shifting to a resting state due to its inertia, but such an operational property of the cutting blade 8 can be dealt with by introducing such a timer 40.

Third Embodiment

A mechanical restraining mechanism formed between the clutch operating lever 38 and the shutter operating lever 19 will be described. It should be noted that the lock switch operating lever 25 associated with the lock mechanism R is omitted here. In this embodiment, the same linkage relationship between the shutter operating lever 19 and the shutter 15 as in the first embodiment or the second embodiment as shown in FIGS. 3 and 6 is adopted. However, an installed state of the clutch operating lever 38 is altered from that in the first embodiment or second embodiment.

Figure 13:
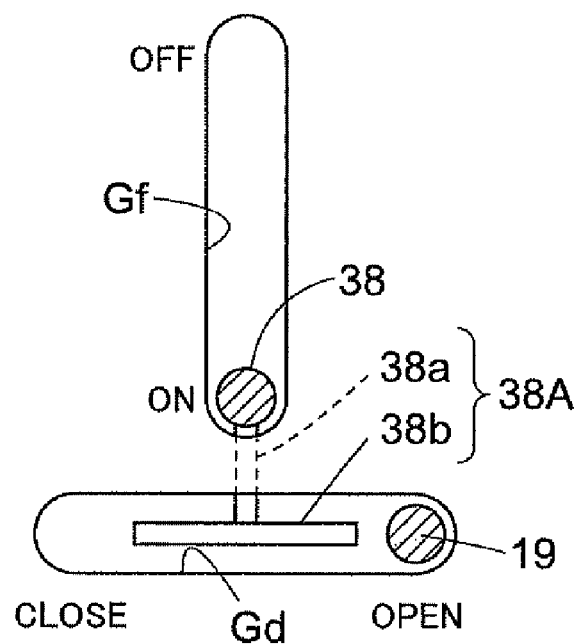
FIG. 13 is a schematic operational diagram showing a state in which a PTO clutch is switched to an on state, and a restraining device is in a shutter opening/closing switching guide for the shutter operating lever.
Figure 14:
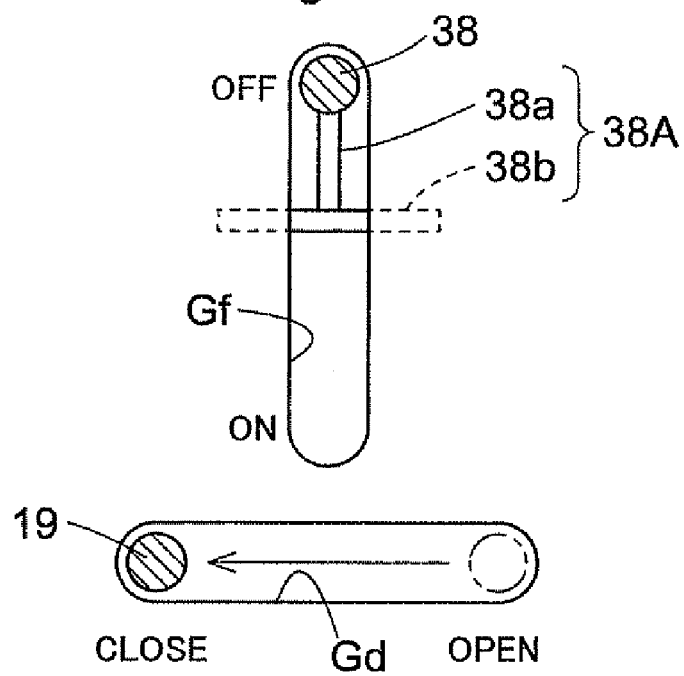
FIG. 14 is a schematic operational diagram showing a state in which the PTO clutch is switched to an off state, and the restraining device is out of the shutter opening/closing switching guide for the shutter operating lever.

Specifically, as shown in FIGS. 13 and 14, a clutch switching guide Gf for the clutch operating lever 38 (between a clutch-in position and a clutch-cut position) and the shutter opening/closing switching guide Gd for the shutter operating lever 19 are arranged in a T-shape. The clutch-in position of the clutch switching guide Gf is located near the shutter opening/closing switching guide Gd, while the clutch-cut position of the clutch switching guide Gf is located away from the shutter opening/closing switching guide Gd.

The clutch operating lever 38 has a restrainer 38A formed thereon which extends towards the shutter opening/closing switching guide Gd for the shutter operating lever 19. The restrainer 38A is composed of: a base rod part 38a extending from the clutch operating lever 38 towards the shutter operating lever 19; and an end rod part 38b integrally formed with an end of the base rod part 38a. The end rod part 38b is in a linear shape corresponding to the shutter opening/closing switching guide Gd for the shutter operating lever 19, and together with the restrainer 38A, forming a T-shape. An entire length of the end rod part 38b along the shutter opening/closing switching guide Gd is set so that the end rod part 38b can be fitted between an open position and a close position of the shutter operating lever 19.

With the configuration described above, a restraint is attained in the following manner. As shown in FIG. 13, when the clutch operating lever 38 is shifted to the clutch-in position, the end rod part 38b of the restrainer 38A extending from the clutch operating lever 38 enters the shutter opening/closing switching guide Gd. This hinders the movement of the shutter operating lever 19 at either the open position or the close position to the corresponding opposite position (the close position or the open position), by bringing the shutter operating lever 19 into contact with a terminal of the end rod part 38b.

As shown in FIG. 14, when the clutch operating lever 38 is shifter to the clutch-cut position, the end rod part 38b of the restrainer 38A extending from the clutch operating lever 38 is retracted from the shutter opening/closing switching guide Gd. This enables the movement of the shutter operating lever 19 along the shutter opening/closing switching guide Gd, and thus the opening/closing operation of the shutter 15. Herein, the restrainer 38A is also referred to as "restraining device" configured to restrain the switching operation of the shutter 15 by the shutter operating tool 19, when the PTO clutch 36 is in an on state.

Other Embodiments (1) For the shutter operating tool, the shutter operating lever 19 was described above. Alternatively, it may be a pedal, or may be an opening/closing selector switch.
(2) For the installment position of the shutter operating tool, it is not necessarily disposed in the vicinity of the driver's seat 5, as long as it is operable by the driver at the operation part 7.
(3) For the mechanical linkage mechanism for linking the shutter 15 and the shutter operating tool 19, the mechanism utilizing the release wire 20 was described. Alternatively, other structures, such as a link mechanism and a gear mechanism, may be incorporated.
(4) For the mechanical linkage mechanism for linking the shutter 15 and the shutter operating tool 19, the mechanism utilizing the release wire 20 was described. Alternatively, a biasing unit for biasing the shutter 15 in a direction of an opened or closed state may be introduced, and the release wire 20 may be used only for operating the shutter 15 to a closed state or an opened state against a biasing force of the biasing unit.
(5) For the opening/closing actuator 30 of the shutter 15, any actuator can be appropriately selected, such as hydraulic cylinder, electric cylinder and rack gear.
(6) For the operation position detecting means for detecting a position of switching operation of the shutter operating tool 19, any means can be used, such as analogue sensor (e.g., potentiometer), and digital sensor (e.g., rotary encoder).
(7) For the linkage between the lock mechanism R and the shutter operating tool 19 (for switching operation of the lock mechanism R) or the lock switch operating tool 25, the linkage may be mechanical or electrical.
(8) For the lock mechanism R, the configuration for locking the shutter 15 in a closed state was described. Alternatively, the configuration for locking the shutter 15 in an opened state may be adopted.

What is claimed is:

1. A riding mower comprising:
a vehicle body;
a driver's seat mounted on the vehicle body;
an operation part arranged around the driver's seat;
a mower unit provided on the vehicle body, comprising:
a mower deck,
a cutting blade installed inside the mower deck, and
a discharge port formed in the mower deck, through which mown grass cut by the cutting blade is discharged from an interior space of the mower unit to outside;
a shutter configured to close the discharge port;
a shutter moving mechanism configured to move the shutter between a close position at which the discharge port is closed and an open position at which the discharge port is opened;
a shutter operating tool which is provided in the operation part and is configured to remotely operate the shutter moving mechanism to open and close the shutter; and
a lock mechanism which is configured to lock the shutter at the close position and is remotely operable from the operation part;
wherein the shutter operating tool and the shutter moving mechanism are linked through an electronic control system programmed to receive an operational displacement of the shutter operating tool as a detection signal and to output a control signal for controlling the shutter moving mechanism based on the detection signal;
wherein the electronic control system comprises:
an operation position detecting sensor configured to detect a position of a switching operation of the shutter operating tool;
a shutter opening/closing determining section configured to determine whether the shutter is opened or closed based on the detection signal from the operation position detecting sensor; and
a shutter driving section configured to output the control signal for controlling the shutter moving mechanism based on a determination result of the shutter opening/closing determining section.

2. The riding mower according to claim 1, wherein a setting of a locking state or a lock release state of the lock mechanism is performed by operating the shutter operating tool.

3. The riding mower according to claim 1, wherein a setting of a locking state or a lock release state of the lock mechanism is performed by operating a lock switch operating tool other than the shutter operating tool.

4. A riding mower comprising:
a vehicle body;
a driver's seat mounted on the vehicle body;
an operation part arranged around the driver's seat;
a mower unit provided on the vehicle body, comprising:
a mower deck,
a cutting blade installed inside the mower deck, and
a discharge port formed in the mower deck, through which mown grass cut by the cutting blade is discharged from an interior space of the mower unit to outside;
a shutter configured to close the discharge port;
a shutter moving mechanism configured to move the shutter between a closed position at which the discharge port is closed and an open position at which the discharge port is opened;
a shutter operating tool which is provided in the operation part and is configured to remotely operate the shutter moving mechanism to open and close the shutter;
a lock mechanism which is configured to lock the shutter at the close position and is remotely operable from the operation part;
a PTO clutch configured to be switched between an on state in which a power is transmitted to the mower unit and an off state in which the power transmission is cut off; and
a restraining device configured to allow a switching of the shutter based on an operation of the shutter operating tool when the PTO clutch is in the off state, and to restrain the switching of the shutter based on the operation of the shutter operating tool when the PTO clutch is in the on state.

5. The riding type mower according to claim 4, wherein the restraining device blocks the switching of the shutter until a predetermined period of time elapses since the PTO clutch is switched to the off state.

* * * * *

UNITED STATES PATENT AND TRADEMARK OFFICE
CERTIFICATE OF CORRECTION

PATENT NO. : 7,814,739 B2  Page 1 of 1
APPLICATION NO. : 12/372983
DATED : October 19, 2010
INVENTOR(S) : Uemura et al.

It is certified that error appears in the above-identified patent and that said Letters Patent is hereby corrected as shown below:

Column 10, line 57, Claim 5, "The riding type mower" should read -- The riding mower --

Signed and Sealed this
First Day of February, 2011

David J. Kappos
*Director of the United States Patent and Trademark Office*